United States Patent
Sarkis et al.

(10) Patent No.: US 11,910,242 B2
(45) Date of Patent: Feb. 20, 2024

(54) FLEXIBLE RESOURCE RESERVATION INDICATION IN SIDELINK

(71) Applicant: QUALCOMM Incorporated, San Diego, CA (US)

(72) Inventors: Gabi Sarkis, San Diego, CA (US); Kapil Gulati, Montgomery, NJ (US); Tien Viet Nguyen, Bridgewater, NJ (US); Shuanshuan Wu, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/031,325

(22) Filed: Sep. 24, 2020

(65) Prior Publication Data

US 2021/0099918 A1 Apr. 1, 2021

Related U.S. Application Data

(60) Provisional application No. 62/907,010, filed on Sep. 27, 2019.

(51) Int. Cl.
*H04W 28/26* (2009.01)
*H04W 72/02* (2009.01)
(Continued)

(52) U.S. Cl.
CPC .......... *H04W 28/26* (2013.01); *H04W 72/02* (2013.01); *H04W 72/0453* (2013.01); *H04W 92/18* (2013.01)

(58) Field of Classification Search
None
See application file for complete search history.

(56) References Cited

U.S. PATENT DOCUMENTS

2017/0347268 A1* 11/2017 Chen .................. H04L 5/0044
2020/0067610 A1*  2/2020 Lee ..................... H04W 76/14
(Continued)

OTHER PUBLICATIONS

Huawei, et al., "Sidelink Physical Layer Procedures for NR V2X", 3GPP Draft, R1-1903944, 3GPP TSG RAN WG1 Meeting #96bis, 3rd Generation Partnership Project (3GPP), Mobile Competence Centre, 650, Route Des Lucioles, F-06921 Sophia-Antipolis Cedex, France, vol. RAN WG1, No. Xi'An, China, Apr. 8, 2019-Apr. 12, 2019, Apr. 2, 2019 (Apr. 2, 2019), XP051707059, 17 pages, Retrieved from the Internet: URL:http://www.3gpp.org/ftp/tsg%5Fran/WG1%5FRL1/TSGR1%5F96b/Docs/R1%2D1903944%2Ezip [retrieved on Apr. 2, 2019], p. 6, par. below Proposal 5.

(Continued)

*Primary Examiner* — Srinivasa R Reddivalam
(74) *Attorney, Agent, or Firm* — Patterson + Sheridan, LLP

(57) ABSTRACT

Certain aspects of the present disclosure provide techniques for flexible resource reservations in sidelink communications. An example method that may be executed by a first user equipment (UE) includes determining, for sidelink communications with a second UE, one or more first resource reservations and one or more second resource reservations. The second resource reservations may have a different frequency resource allocation than the first resource reservations. The method also includes transmitting, to the second UE, control information having an indication of the first resource reservations and the second resource reservations. The method further includes communicating with the second UE based on the first resource reservations and the second resource reservations.

26 Claims, 7 Drawing Sheets

(51) Int. Cl.
*H04W 72/0453* (2023.01)
*H04W 92/18* (2009.01)

(56) References Cited

U.S. PATENT DOCUMENTS

2020/0163085 A1* 5/2020 Takeda .................. H04L 5/0094
2021/0306824 A1* 9/2021 Li ........................... H04W 4/40
2021/0337512 A1* 10/2021 Belleschi .............. H04W 28/26

OTHER PUBLICATIONS

Intel Corporation: "Summary#4 for AI 7.2.4.2.2 Mode-2 Resource Allocation", 3GPP Draft, 3GPP TSG RAN WG1 Meeting #98, R1-1909892—Summary#4 of 5G V2X Mode 2 V1, 3rd Generation Partnership Project (3GPP), Mobile Competence Centre, 650, Route Des Lucioles, F-06921, Sophia-Antipolis Cedex, France, vol. Ran WG1, No. Prague, Czech Republic, Aug. 26, 2019-Aug. 30, 2019, Sep. 3, 2019 (Sep. 3, 2019), XP051766483, 34 pages, Retrieved from the Internet: URL: http://www.3gpp.org/ftp/tsg_ran/WG1_RL1/TSGR1_98/Docs/R1-1909892.zip [retrieved on Sep. 3, 2019]. paragraph [0002], p. 26, p. 29, Section 4.
Interdigital, et al., "NR Sidelink Resource Allocation Mechanism for Mode 2", 3GPP Draft, 3GPP TSG RAN WG1 #98 ,R1-1909030 NR Sidelink Resource Allocation Mechanism for Mode 2 Final, 3rd Generation Partnership Project (3GPP), Mobile Competence Centre, 650, Route Des Lucioles, F-06921, Sophia-Antipolis Cedex, France, vol. RAN WG1, No. Prague, Czech; Aug. 26, 2019-Aug. 30, 2019, Aug. 16, 2019 (Aug. 16, 2019), XP051765634, 6 pages, Retrieved from the Internet: URL: http://www.3gpp.org/ftp/tsg_ran/WG1_RL1/TSGR1_98/Docs/R1-1909030.zip [retrieved on Aug. 16, 2019] paragraph [02. 3] - paragraph [02 .4].
International Search Report and Written Opinion—PCT/US2020/052702—ISA/EPO—dated Nov. 25, 2020.
Oppo: "Physical Layer Procedure for NR-V2X," 3GPP Draft, 3GPP TSG RAN WG1 Meeting #95, R1-1812811, 3rd Generation Partnership Project (3GPP), Mobile Competence Centre, 650, Route Des Lucioles, F-06921, Sophia-Antipolis Cedex, France, Nov. 12-16, 2018 (Nov. 16, 2018), pp. 1-5, XP051479056, 5 pages, Retrieved from the Internet: URL: http://www.3gpp.org/ftp/tsg%5Fran/WG1%5FRL1/TSGR1%5F95/Docs/R1%2D1812811%2Ezip [retrieved on Nov. 16, 2018] paragraph [02.3]-paragraph [0003].

* cited by examiner

US 11,910,242 B2

FLEXIBLE RESOURCE RESERVATION INDICATION IN SIDELINK

CROSS-REFERENCE TO RELATED APPLICATION

This application claims benefit of and priority to U.S. Provisional Patent Application No. 62/907,010, filed Sep. 27, 2019, which is hereby incorporated by reference in its entirety.

BACKGROUND

Field of the Disclosure

Aspects of the present disclosure relate to wireless communications, and more particularly, to techniques for managing resource reservations for sidelink communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that may include desirable resource reservations for sidelink communications.

Certain aspects provide a method for wireless communication by a first user equipment (UE). The method generally includes determining, for sidelink communications with a second UE, one or more first resource reservations and one or more second resource reservations, wherein the second resource reservations have a different frequency resource allocation than the first resource reservations. The method also includes transmitting, to the second UE, control information having an indication of the first resource reservations and the second resource reservations. The method further includes communicating with the second UE based on the first resource reservations and the second resource reservations.

Certain aspects provide a method for wireless communication by a second user equipment (UE). The method generally includes receiving, from a first UE, control information having an indication of one or more first resource reservations and one or more second resource reservations, wherein the second resource reservations have a different frequency resource allocation than the first resource reservations. The method also includes determining time and frequency resource allocations for communicating with the first UE based on the indication of the first resource reservations and the second resource reservations. The method further includes communicating with the first UE based on the determination of the time and frequency resource allocations.

Certain aspects provide an apparatus for wireless communication, which may include a memory and a processor coupled to the memory. The processor and the memory may be configured to determine, for sidelink communications with a UE, one or more first resource reservations and one or more second resource reservations where the second resource reservations have a different frequency resource allocation than the first resource reservations. The apparatus may further include a transceiver configured to transmit, to the UE, control information having an indication of the first resource reservations and the second resource reservations; and communicate with the UE based on the first resource reservations and the second resource reservations.

Certain aspects provide an apparatus for wireless communication, which may include a transceiver configured to receive, from a UE, control information having an indication of one or more first resource reservations and one or more second resource reservations where the second resource reservations have a different frequency resource allocation than the first resource reservations. The apparatus may further include a memory and a processor coupled to the memory. The processor and the memory may be configured to determine time and frequency resource allocations for communicating with the UE based on the indication of the first resource reservations and the second resource reservations; and where the transceiver is further configured to communicate with the UE based on the determination of the time and frequency resource allocations.

Certain aspects provide an apparatus for wireless communication by a first UE. The apparatus generally includes means for determining, for sidelink communications with a second UE, one or more first resource reservations and one or more second resource reservations, wherein the second resource reservations have a different frequency resource allocation than the first resource reservations. The apparatus also includes means for transmitting, to the second UE, control information having an indication of the first resource reservations and the second resource reservations. The apparatus further includes means for communicating with the second UE based on the first resource reservations and the second resource reservations.

Certain aspects provide an apparatus for wireless communication by a second UE. The apparatus generally includes means for receiving, from a first UE, control information having an indication of one or more first resource reservations and one or more second resource reservations, wherein the second resource reservations have a different frequency resource allocation than the first resource reservations. The apparatus also includes means for determining time and frequency resource allocations for communicating with the first UE based on the indication of the first resource reservations and the second resource reservations. The apparatus further includes means for communicating with the first UE based on the determination of the time and frequency resource allocations.

Certain aspects provide a non-transitory computer-readable medium storing instructions that, when executed by one or more processors of a first UE, cause the first UE to determine, for sidelink communications with a second UE, one or more first resource reservations and one or more second resource reservations, wherein the second resource reservations have a different frequency resource allocation than the first resource reservations; transmit, to the second UE, control information having an indication of the first resource reservations and the second resource reservations; and communicate with the second UE based on the first resource reservations and the second resource reservations.

Certain aspects provide a non-transitory computer-readable medium storing instructions that, when executed by one or more processors of a second UE, cause the second UE to receive, from a first UE, control information having an indication of one or more first resource reservations and one or more second resource reservations, wherein the second resource reservations have a different frequency resource allocation than the first resource reservations; determine time and frequency resource allocations for communicating with the first UE based on the indication of the first resource reservations and the second resource reservations; and communicate with the first UE based on the determination of the time and frequency resource allocations.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
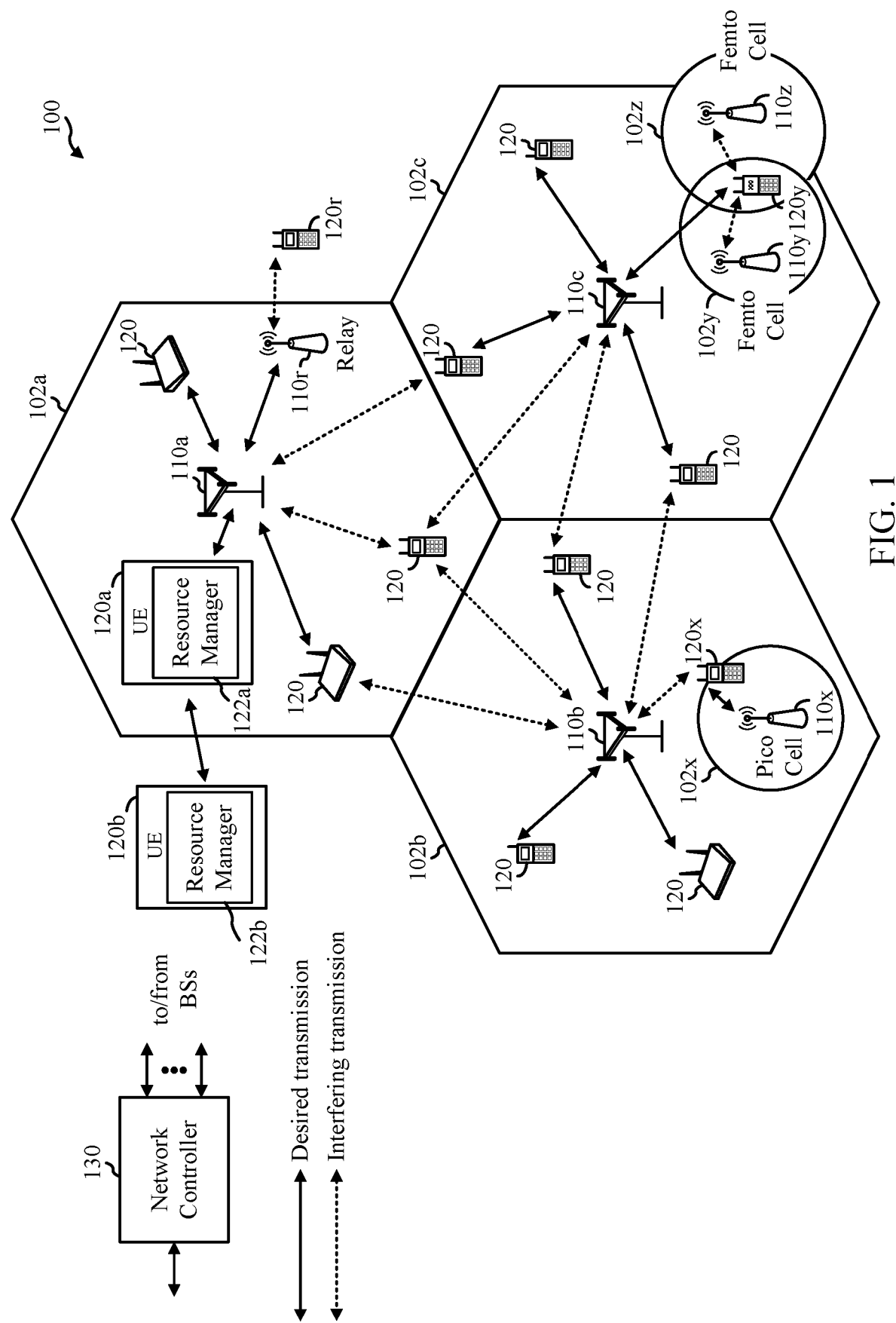
FIG. 1 is a block diagram conceptually illustrating an example telecommunications system, in accordance with certain aspects of the present disclosure.

Aspects of the present disclosure provide apparatus, methods, processing systems, and computer readable mediums for managing flexible resource reservations for sidelink communications. In certain wireless communication systems (e.g., 5G NR), a user equipment (UE) may signal to another UE sidelink control information (SCI) that includes resource (e.g., frequency-domain resources and/or time-domain resources) reservations for sidelink communications. In certain cases, all of the resource reservations in the SCI may have the same frequency-domain resources or the same frequency bandwidth allocation (e.g., the same number of resource blocks (RBs)). The SCI that does not support a flexible frequency-domain resource reservation (e.g., different number of RBs per reservation) may impact the performance of data (e.g., PSSCH transmissions) decoding, especially in cases where feedback is used.

Aspects of the present disclosure provide various techniques for configuring and/or indicating a flexible frequency resource reservation for sidelink communications. The flexible frequency resource reservations described herein may enable desirable spectral efficiency and desirable performance, especially in cases where feedback based retransmissions are enabled.

The following description provides examples of sidelink resource reservation management in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As shown in FIG. 1, a first UE 120a may be communicating with a second UE 120b via sidelink resource reservations as further described herein. The first UE 120a includes a resource manager 122a that transmits/receives control information having an indication of reservations resources with different frequency resource allocations, and the second UE 120b includes a resource manager 122b that transmits/receives control information having an indication of reservations resources with different frequency resource allocations.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions. The PSSCH may carry data transmissions, and the PSFCH may carry feedback such as hybrid automatic repeat request (HARQ) feedback and/or channel state information related to a sidelink channel quality.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported, as multi-layer transmissions. Aggregation of multiple cells may be supported.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

The wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
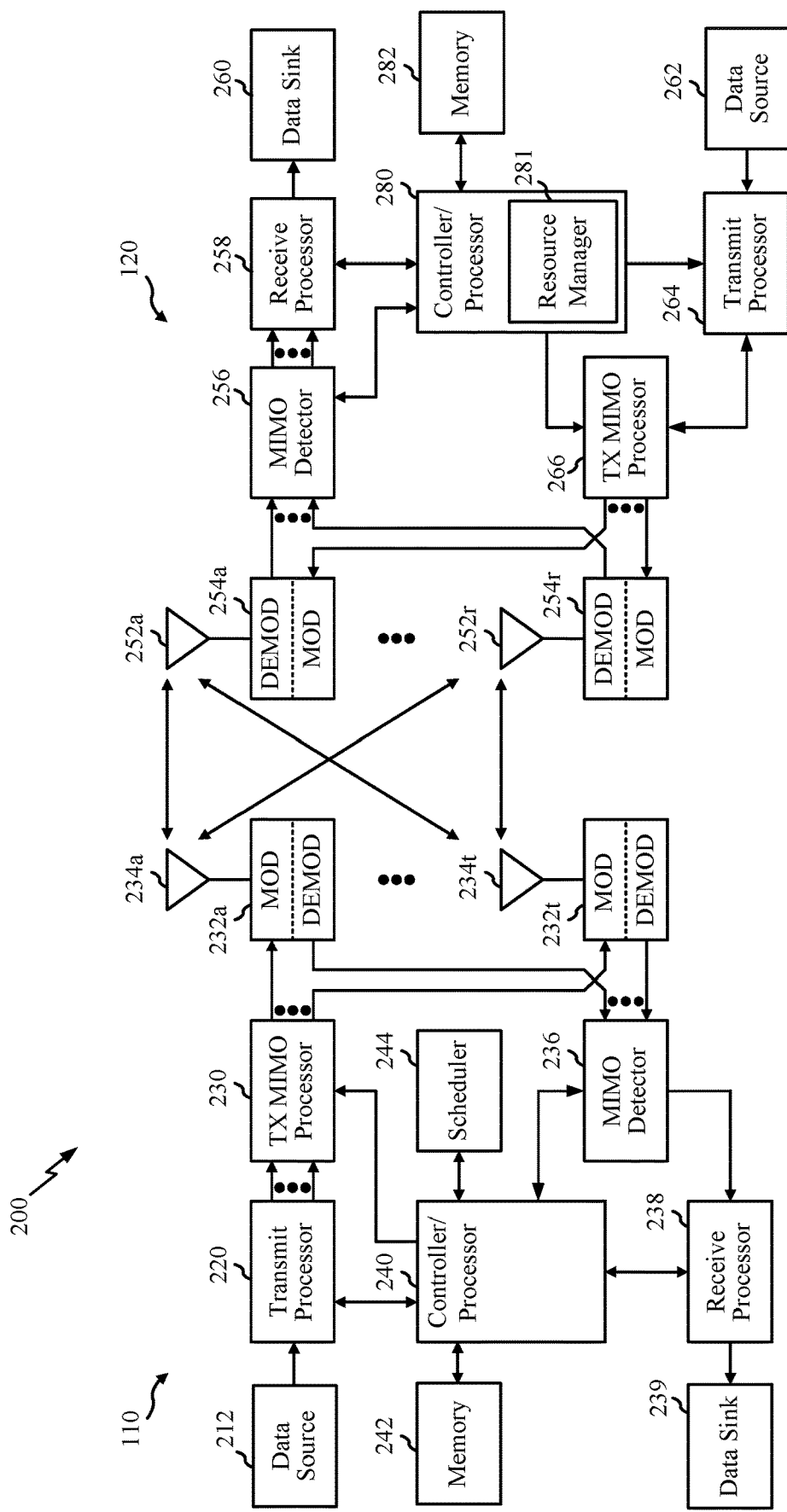
FIG. 2 is a block diagram conceptually illustrating a design of an example a base station (BS) and a user equipment (UE), in accordance with certain aspects of the present disclosure.

FIG. 2 illustrates example components of a BS 110 and a UE 120 (e.g., in the wireless communication network 100 of FIG. 1), which may be used to implement aspects of the present disclosure.

At the BS 110, a transmit processor 220 may receive data from a data source 212 and control information from a controller/processor 240. The control information may be for PSDCH, PSCCH, PSSCH, PSFCH, etc. The data may be for the physical downlink shared channel (PDSCH), etc. The processor 220 may process (e.g., encode and symbol map) the data and the control information to obtain data symbols and control symbols, respectively. The transmit processor 220 may also generate reference symbols, such as for a primary synchronization signal (PSS), a secondary synchronization signal (SSS), and a physical broadcast channel (PBCH) demodulation reference signal (DMRS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a-232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. The downlink signals from the MODs 232a-232t may be transmitted via antennas 234a-234t, respectively.

At the UE 120a, antennas 252a-252r may receive the downlink signals from the BS 110 and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at the UE 120a, a transmit processor 264 may receive and process data (e.g., for a physical uplink shared channel (PUSCH)) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a TX MIMO processor 266 if applicable, further processed by the DEMODs in transceivers 254a-254r (e.g., for SC-FDM, etc.), and transmitted to the BS 110. At the BS 110, the uplink signals from the UE 120a may be received by the antennas 234, processed by the MODs 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110 and the UE 120, respectively. A scheduler 244 may schedule the UEs 120 for data transmission on a downlink and/or an uplink.

The controller/processor 280 and/or other processors and modules at the UE 120 may perform or direct the execution of processes for techniques described herein. For example, as shown in FIG. 2, the controller/processor 280 of the UE 120a has a resource manager 281 that transmits/receives control information having an indication of reservations resources with different frequency resource allocations, according to aspects described herein. Although shown at the Controller/Processor, other components of the UE 120 and the BS 110 may be used to perform the operations described herein. While the examples provided herein are described with respect to a BS communicating with a UE, aspects of the present disclosure may also be applied to a UE communicating with another UE such as the UE 120a communicating with the UE 120b via sidelink communications as depicted in FIG. 1.

Figure 3B:
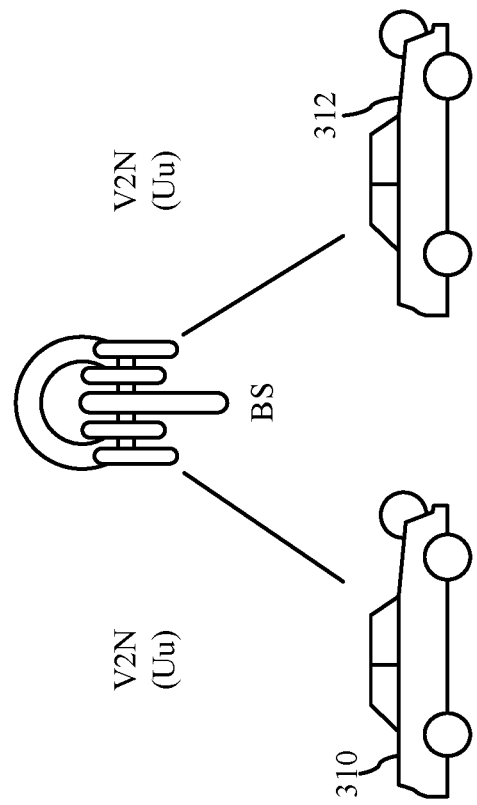
FIGS. 3A and 3B illustrate vehicle to everything (V2X) systems, in accordance with certain aspects of the present disclosure.
Figure 3A:
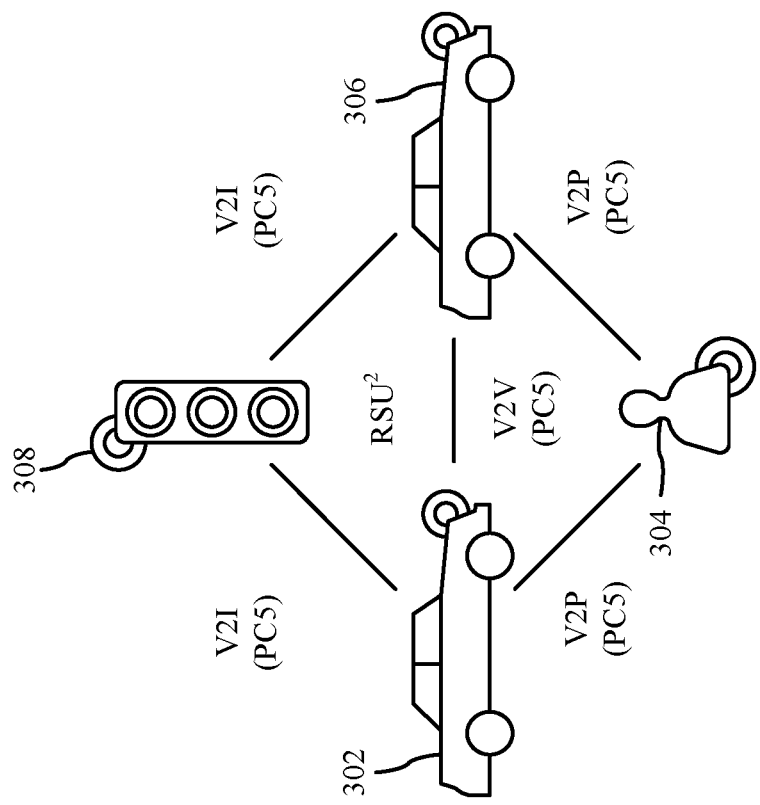

FIGS. 3A and 3B illustrate vehicle to everything (V2X) systems, in accordance with certain aspects of the present disclosure. The V2X systems, provided in FIGS. 3A and 3B provides two complementary transmission modes. A first transmission mode involves direct communications (e.g., also referred to herein as sidelink communications between UEs) between participants in the local area. Such communications are illustrated in FIG. 3A. A second transmission mode involves network communications through a network as illustrated in FIG. 3B, which may be implemented over a Uu interface (e.g., a wireless communication interface between a radio access network (RAN) and a UE).

Referring to FIG. 3A, a V2X system is illustrated with two vehicles. The first transmission mode allows for direct communication between different participants in a given geographic location. As illustrated, a first vehicle 302 can have a wireless communication link with an individual 304 (V2P) (e.g., via a UE) through a PC5 interface. Communications between the first vehicle 302 and a second vehicle 306 (V2V) may also occur through a PC5 interface. In a like manner, communication may occur from the first vehicle 302 to other highway components, such as a traffic signal 308 or sign (V2I) through a PC5 interface. In each example illustrated, two-way communication may take place between elements, therefore each element may be a transmitter and a receiver of information. In the configuration provided, the first transmission mode is a self-managed system and no network assistance is provided. Such transmission modes may enable improved spectral efficiency, reduced cost, and increased reliability as network service interruptions do not occur during handover operations for moving vehicles. Resource assignments do not need coordination between operators and subscription to a network is not necessary, therefore there is reduced complexity for such self-managed systems. The V2X system may be configured to operate in a licensed or unlicensed spectrum, thus any vehicle with an equipped system may access a common frequency and share information. Such harmonized/common spectrum operations allows for safe operation. The V2X system Referring to FIG. 3B, a second of two complementary transmission modes is illustrated. In the illustrated embodiment, a vehicle 310 may communicate to another vehicle 312 through network communications. These network communications may occur through discrete nodes, such as a BS (e.g., an eNB or gNB), that send and receive information between vehicles. The network communications may be used, for example, for long range communications between the vehicles (310, 312), such as noting the presence of an accident approximately 1 mile ahead. Other types of communication may be sent by the node to the vehicles (310, 312), such as traffic flow conditions, road hazard warnings, environmental/weather reports, service station availability and other like data. Such data can be obtained from cloud-based sharing services.

Example Flexible Resource Reservation Indication in Sidelink

In certain wireless communication systems (e.g., 5G NR), a user equipment (UE) may signal to another UE sidelink control information (SCI) that includes resource (e.g., frequency-domain resources and/or time-domain resources) reservations for sidelink communications. In certain cases, the UE may broadcast the SCI to multiple UEs to enable some of the UEs to refrain from communicating during the resource reservations. As used herein, a resource reservation for sidelink communications may refer to a selection of resources (time resources and/or frequency resources) for one or more transmissions to one or more UEs. In aspects, the resource reservation may indicate a frequency resource assignment, a time resource assignment, and/or a resource reservation period. The frequency resource assignment may include one or more frequency resources for the transmissions to one or more UEs, and the resource allocation unit in the frequency domain may be in terms of one or more resource blocks, one or more bandwidth part (BWPs) in a carrier, or one or more sub-channels in a BWP or carrier. The time resource assignment may include one or more time-domain resources for the transmission to one or more UEs, and the resource allocation unit in the time domain may be in terms of symbols, mini-slots, slots, etc. The resource reservation period may provide a periodicity with which the frequency-time resources are assigned/reserved, for example, a length of the period (e.g., in milliseconds) and a total number of periods for future transmission occasions.

The resource reservations may be for a transmission of a transport block (TB) or a retransmission of the same TB. A single SCI may include a maximum number of reservations (such as 2, 3, or 4 resource reservations), which may be a preconfigured value or configurable via control signaling (e.g., radio resource control (RRC) signaling) from a base station (e.g., BS 110a).

The resource reservation may indicate time-domain and/or frequency-domain resources for a scheduled transmission. In certain cases, the time-domain resource of the resource reservation may include a number of symbols within a slot and which slot is used for the transmission. While the examples provided herein are described with respect to the resource reservations being set in terms of slots, aspects of the present disclosure may also be applied to other suitable time-domain units including mini-slots (sub-slots) or symbols.

In certain cases, all of the resource reservations in an SCI may have the same frequency-domain resources or the same frequency bandwidth allocation (e.g., the same number of resource blocks (RBs)). For example, if all the resource reservations in the SCI have the same number of RBs, then a first resource reservation may provide the RB allocation (e.g., the number of resource blocks and location within a frequency resource grid). The other resource reservations in the SCI may provide a slot offset (or slot index) and a starting RB (or sub-channel) if different from the starting RB of the first resource reservation. In other words, the frequency-domain and the time-domain resource allocations in subsequent resource reservations may be indicated based on an offset relative to the first resource reservation in the SCI. Such an SCI configuration may enable a reduction in the size of the SCI, rather than providing a full time-domain and/or frequency-domain allocation (e.g., offset and size) in each of the resource reservations.

However, the SCI that does not support a flexible frequency-domain resource reservation (e.g., different number of RBs per reservation) may impact the performance of data (e.g., PSSCH transmissions) decoding, especially in cases where hybrid automatic repeat request (HARQ) feedback is used to trigger retransmissions. For example, if the transmitting/scheduling UE is aware of the channel conditions, for example, via feedback (e.g., HARQ feedback and/or channel state information) from the receiving UE, the transmitting UE may provide resource reservations with different frequency-domain resources within the same SCI or update previous allocated resource reservations. As an example, suppose the transmitting UE notices, via HARQ feedback, that the receiving UE is occasionally experiencing decoding failures, the transmitting UE may increase the frequency resources of subsequent resource reservations within an SCI in order to facilitate greater redundancy for HARQ retransmissions on the subsequent resource reservations. Expressed another way, the first resource reservation in the SCI may have a smaller frequency resource allocation, while the subsequent resource reservations, in the same SCI, have larger frequency resource allocations for potential HARQ retransmissions.

Aspects of the present disclosure provide various techniques for configuring and/or indicating a flexible frequency resource reservation for sidelink communications. The flexible frequency resource reservations described herein may enable desirable spectral efficiency and desirable performance (such as desirable data rates and/or latencies), especially in cases where feedback based retransmissions are enabled. For example, the flexible frequency resource reservations may have an initial resource reservation with a first set of RBs and subsequent resource reservations, which are scheduled after the initial resource reservation, with a smaller number of RBs than the initial resource reservation, which may enable spectrally efficient resource allocations. In other cases, the flexible frequency resource reservations may have an initial resource reservation with a first set of RBs and subsequent resource reservations with a greater number of RBs than the initial resource reservation, which may enable desirable performance for potential HARQ retransmissions.

In certain aspects, the UEs may be configured with various conditions that trigger support for a single SCI with a flexible frequency resource allocation, which may include an SCI having resource reservations with at least one different frequency resource allocation (e.g., a different number of RBs) than other resource reservations. In other aspects, the frequency resources allocated to a UE may be dynamically indicated via SCI having resource reservations with different frequency resource allocations. According to certain aspects, as the time-domain resources may be implicitly indicated, the first resource reservation in an SCI may only indicate a frequency resource allocation, and the subsequent resource reservations in the SCI may indicate any changes in the frequency resource allocation.

Figure 4:
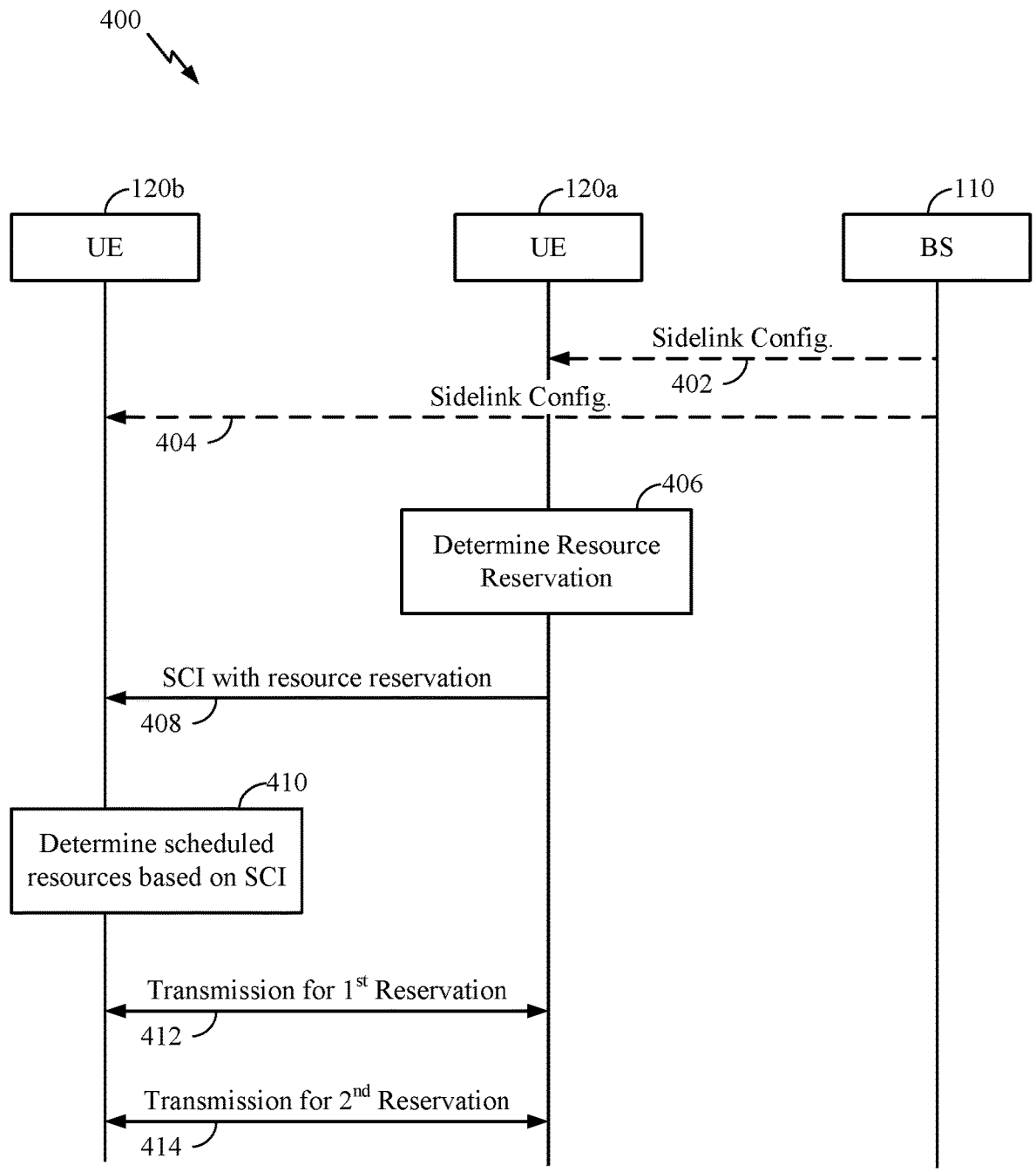
FIG. 4 is a call flow diagram illustrating example operations for managing resource reservations for sidelink communications, in accordance with certain aspects of the present disclosure.

FIG. 4 is a call flow diagram illustrating example operations 400 for configuring and/or indicating a flexible resource reservation for sidelink communications, in accordance with certain aspects of the present disclosure. As shown at 402 and 404, a BS 110 may transmit control signaling (e.g., RRC signaling) to a first UE 120a and a second UE 120b, respectively. The control signaling may include a configuration that indicates whether control information (e.g., SCI) includes resource reservations with different frequency resource allocations, as further described herein. In other aspects, the UEs 120a, 120b may be preconfigured to allocate resource reservations with different frequency resource allocations in an SCI and/or receive an SCI with resource reservations having different frequency resource allocations.

At 406, the first UE 120a may determine, for sidelink communications with the second UE 120b, resource reservations with a flexible frequency resource allocation. At 408, the first UE 120a may transmit, to the second UE 120b, control information (e.g., SCI) having an indication of the resource reservations with the flexible frequency resource allocation. In certain cases, the resource reservations may include resources for an initial transmission at slot X and subsequent feedback based retransmissions at slots X+5, X+10, and X+16, where the subsequent retransmission have increasing frequency resource allocations (e.g., an increase number of RBs). As another example, the last two resource reservations in the SCI may have a different frequency resource allocation than the first two resource reservations.

The flexible frequency resource allocation may be indicated via various methods, as further described herein, such as an explicit field in the SCI, a special value of an existing field in the SCI, or a certain type of transmission (e.g., feedback based retransmission or a transmission with the same TB or a different TB). In certain aspects, a flexible frequency resource allocation in the SCI may depend on whether the resource reservations are associated with feedback based retransmissions (e.g., retransmissions are sent based on HARQ feedback) or non-feedback based retransmissions (e.g., retransmissions are sent by default without HARQ feedback). For example, if the resource reservations are associated with non-feedback based retransmissions, the frequency resource allocation may remain the same in the SCI due to the absence of feedback. In other cases, if the resource reservations are associated with feedback based retransmissions, the frequency resource allocations in the SCI may differ from each other.

At 410, the second UE 120b may determine time and frequency resource allocations for communicating with the first UE 120a based on the indication of the resource reservations. At 412, the second UE 120b may communicate with the first UE 120a based on the determination of the time and frequency resource allocations with respect to the first resource reservation in the SCI. At 414, the second UE 120b may communicate with the first UE 120a based on the determination of the time and frequency resource allocations with respect to the second resource reservation in the SCI. For example, suppose that the second UE 120b indicates to the first UE 120a that a decode failure occurred for the initial transmission at 412, in response to the HARQ feedback, the first UE 120a may send a retransmission with a larger frequency resource allocation and greater redundancy during the next scheduled transmission at 414, which may enable the second UE 120b to successfully decode the retransmission.

Figure 5:
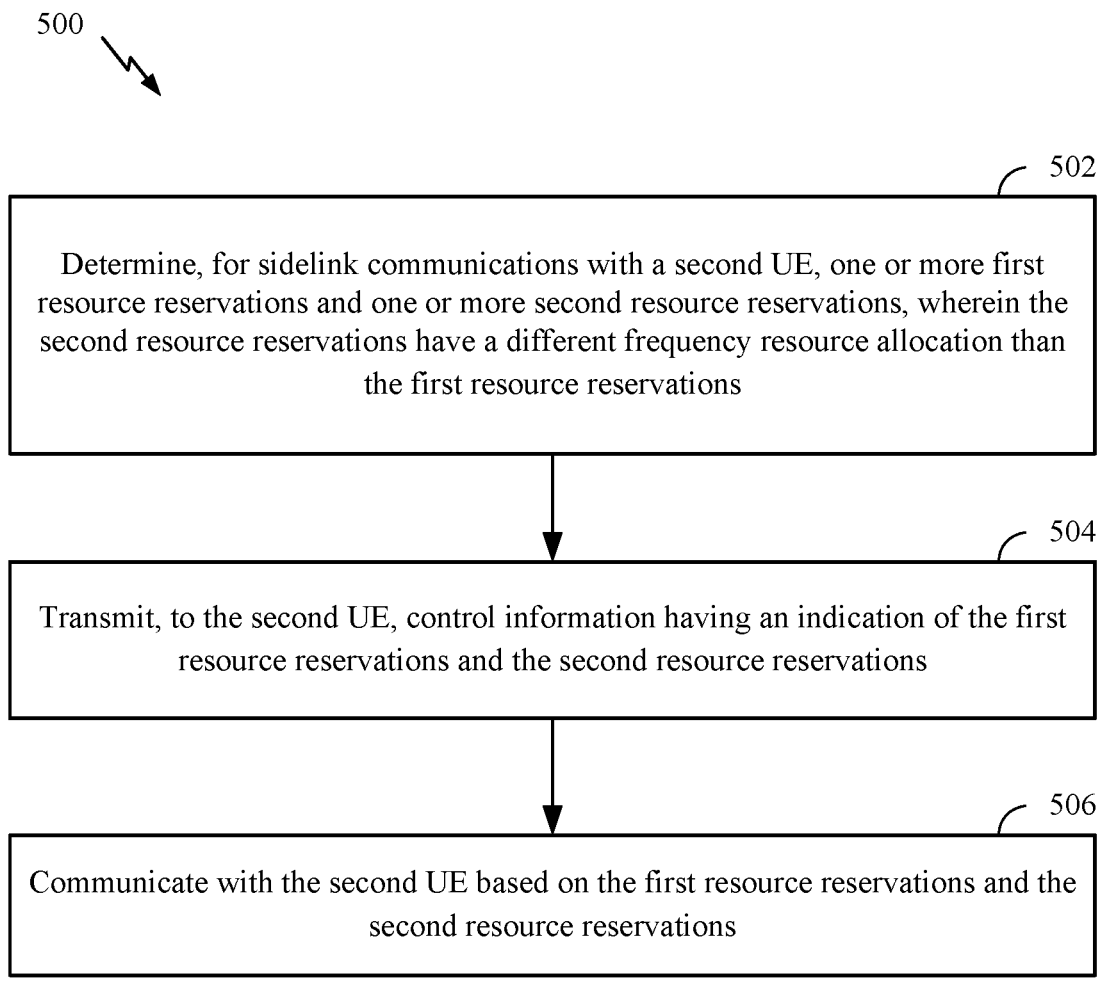
FIG. 5 is a flow diagram illustrating example operations for wireless communications by a first UE, in accordance with certain aspects of the present disclosure.

FIG. 5 is a flow diagram illustrating example operations 500 for wireless communication, in accordance with certain aspects of the present disclosure. The operations 500 may be performed, for example, by a user equipment (e.g., the UE 120a in the wireless communication network 100). The operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at 502, where a first UE (e.g., the first UE 120a) may determine, for sidelink communications with a second UE (e.g., the second UE 120b), one or more first resource reservations and one or more second resource reservations, and the second resource reservations have a different frequency resource allocation than the first resource reservations. At 504, the first UE may transmit, to the second UE, control information (e.g., SCI) having an indication of the first resource reservations and the second resource reservations. At 506, the first UE may communicate with the second UE based on the first resource reservations and the second resource reservations.

In certain aspects, at 506, the first UE may communicate with the second UE, for example, by transmitting data transmissions to the second UE in accordance with the resource reservations (e.g., at the scheduled time-domain resources and with the allocated frequency-domain resources). In other aspects, the first UE may communicate with the second UE by receiving data transmissions from the second UE in accordance with the resource reservations.

In aspects, the frequency resource allocation of the second resource reservations includes a different number of resource blocks than the first resource reservations. For example, the frequency resource allocation associated with each of the second resource reservations may have a greater number of resource blocks than the first resource reservation. In other examples, the frequency resource allocation associated with each of the second resource reservations may have a fewer number of resource blocks than the first resource reservation.

In certain aspects, the first UE and/or second UE may be configured with various conditions or rules that trigger support of a single SCI with a flexible frequency resource allocation. For example, the first UE may obtain a configuration indicating whether the control information includes resource reservations with different frequency resource allocations. In aspects, the first UE and/or second UE may be configured by a base station (e.g., the BS 110) via control signaling such as RRC signaling, Medium Access Control (MAC) signaling (e.g., a MAC control element), or downlink control information (DCI). That is, the first UE and/or second UE may receive, from a base station, control signaling that indicates the configuration. In other aspects, the first UE and/or second UE may be preconfigured with the configuration indicating whether the control information includes resource reservations with different frequency resource allocations. That is, the configuration is preconfigured on the first UE and/or second UE.

In aspects, the configuration may indicate that a threshold number of resource reservations in the control information determines whether the control information includes resource reservations with different frequency resource allocations. For example, the configuration may indicate that a threshold number of resource reservations in the control information determines whether the control information includes the one or more second resource reservations with the different frequency resource allocation.

In certain cases, the configuration may indicate that if a number of resource reservations in the control information is less than (or equal to) the threshold number, the control information may include resource reservations with different frequency resource allocations (e.g., the one or more second resource reservations). If the number of the resource reservations in the control information is greater than (or equal to) the threshold number, the control information includes resource reservations with the same frequency resource allocation. As an example, if a maximum number of reservation per SCI is set to two, the configuration may allow for different frequency resource allocations in the SCI. Otherwise, the SCIs with a different number of reservations (e.g., 3 or 4) has the same frequency allocation.

In other cases, the configuration may indicate that if a number of resource reservations in the control information is greater than (or equal to) the threshold number, the control information may include resource reservations with different frequency resource allocations (e.g., the one or more second resource reservations). If the number of the resource reservations in the control information is less than (or equal to) the threshold number, the control information includes resource reservations with the same frequency resource allocation.

According to certain aspects, the configuration may indicate that resource reservations may be partitioned into subsets, where one of the subsets has a different frequency resource allocation than another subset in the control information. For example, the configuration indicates that one or more first subsets of resource reservations have a different frequency resource allocation than a second subset of the resource reservations in the control information.

In aspects, the subsets may be indicated by a number of resource reservations (e.g., 1, 2, or 3) associated with a segment of the resource reservations in the control information. For example, as the resource reservations may be ordered in a sequence in the control information, the subset that may have the different frequency resource allocation may be the first or last segment of resources reservations in the control information, and the number of resource reservations associated with the segment may provide the length of the segment of resource reservations in the control information. The location of the segment (e.g., first or last) in the control information may be preconfigured or configurable by control signaling. For example, the configuration may indicate that two resource reservations are in the segment, which may have the different frequency resource allocation. In certain cases, the segment may be associated with the first two resource reservations, which may have different frequency resource allocations than the last resource reservations. In other cases, the segment may be associated with the last two resource reservations, which may have different frequency resource allocations than the first resource reservations. As an example, the one or more second resource reservations of operations 500 may include the segment of the resource reservations indicated in the configuration.

In certain aspects, the configuration may indicate that each resource reservation in the control information has a flag that indicates whether the resource reservation has a different frequency resource allocation than a previous resource reservation. For example, the configuration may indicate that a flag associated with each of the first resource reservations and the second resource reservations of operations 500 indicates which one or more resource reservations are included in the one or more first sub sets.

According to certain aspects, the configuration may indicate that whether the control information includes resource reservations with different frequency resource allocations is based on whether resource reservations in the control information are associated with feedback based retransmissions or non-feedback based retransmission. For example, if one or more resource reservations in the control information are associated with feedback based retransmissions, the control information may include resource reservations with different frequency resource allocations. In other cases, if the resource reservations in the control information are associated with non-feedback based retransmissions, the control information may include resource reservations with the same frequency resource allocation.

In aspects, the configuration may indicate that whether the control information includes resource reservations with different frequency resource allocations is based on whether resource reservations in the control information are associated with the same TB or different TBs. For example, if the resource reservations in the control information are associated with the same TB, the control information may include resource reservations with the same frequency resource allocation. In other cases, if the resource reservations in the control information are associated with different TBs, the control information may include resource reservations with different frequency resource allocations.

In certain aspects, the size of the control information may be based on the configuration. For example, a flag associated with each resource reservation in the control information affects the size of the control information, and in some cases, may increase the size of the control information. As another example, the indication of the number of resource reservations in a segment may take an additional field, which affects the size of the control information. In other cases, if the flexible frequency resource allocation is based on feedback bases retransmissions, the control information size may not change.

In aspects, the frequency resources allocated to a UE may be dynamically indicated via SCI having resource reservations with different frequency resource allocations. In certain aspects, the control information may include an explicit field indicating which one or more resource reservations has a different frequency resource allocation. For example, the field may be a bitmap having a plurality of bits, and each of the bits corresponds to a different resource reservation in the control information. A certain value of each bit may indicate that the resource reservation associated with the bit has a different frequency resource allocation.

In certain cases, the field may indicate a number of resource reservations (e.g., 1, 2, or 3) associated with a segment of the resource reservations in the control information as described herein. For instance, as the resource reservations may be ordered in a sequence in the control information, the segment of resource reservations as indicated in the control information may be the first or last segment of resources reservations in the control information, and the number of resource reservations associated with the segment may provide the length of the segment of resource reservations in the control information. The location of the segment (e.g., first or last) in the control information may be preconfigured or configurable by control signaling. For example, the first UE may interpret the number of resource reservations associated with the segment as corresponding to the first or last resources reservations in the control information.

In aspects, the field may indicate whether the resource reservations are associated with feedback based retransmissions or non-feedback based retransmissions, which may implicitly indicate whether the resource reservations in the control information have different frequency resource allocations. In other words, the field may indicate which one or more resource reservations in the control information have the different frequency resource allocation based on the one or more resource reservations being associated with feedback based retransmissions or non-feedback based retransmissions. For example, if one or more resource reservations in the control information are associated with feedback based retransmissions, the control information may include resource reservations with different frequency resource allocations. In other cases, if the resource reservations in the control information are associated with non-feedback based retransmissions, the control information may include resource reservations with the same frequency resource allocation.

In aspects, the field may indicate whether the resource reservations are associated with the same TB or different TBs, which may implicitly indicate whether the resource reservations in the control information have different frequency resource allocations. Expressed another way, the field may indicate which one or more resource reservations in the control information has the different frequency resource allocation based on the one or more resource reservations being associated with the same TB or different TBs. For example, if the resource reservations in the control information are associated with the same TB, the control information may include resource reservations with the same frequency resource allocation. In other cases, if the resource reservations in the control information are associated with different TBs, the control information may include resource reservations with different frequency resource allocations.

According to certain aspects, rather than having a separate field, an existing field (e.g., a resource reservation filed) in the control information may have a special value that indicates whether the resource reservations have different frequency resource allocation. For instance, the control information may include a field having a plurality of values, where one of the values of the field indicates that the control information includes resource reservations (e.g., the one or more second resource reservations) with the different frequency resource allocation. As an example, the existing field may be a resource reservation field, and if the first resource reservation field is set to a certain value (e.g., all zeros), the remaining resource reservations may have different frequency resource allocations. In certain cases, the field is a resource reservation field of one of the first resource reservations and the second resource reservations of operations 500.

In aspects, the size of the SCI may remain the same size regardless of whether different frequency resource allocations for resource reservations are indicated in the SCI. In some aspects, the control information may have a fixed size. As an example, as the size of the control information may be fixed, a total number of resource reservations indicated in the control information may be based on the number of resource reservations that have different frequency resource allocations.

For example, suppose the control information has a size that can carry up to four resource reservation fields (Reservation Field 0, Reservation Field 1, Reservation Field 2, and Reservation Field 3) as shown below in Table 1. In the first case (SCI Case 1), the SCI includes an explicit field with a value of '0', which, in this example, indicates the resource reservation fields have the same frequency resource allocation of resource blocks (RB_0). In this example, the SCI indicates resource reservations for four transmissions.

In the second case (SCI Case 2), the SCI includes an explicit field with a value of '1', which, in this example, indicates the resource reservation fields have different frequency resource allocations. As shown in Table 1, the first resource reservation uses the bits of Reservation Field 0 to indicate the RB_0 frequency resource allocation, and the second resource reservation may use the bits of Reservation Fields 1 and 2 to indicate the different resource blocks (RB_1) allocated to the scheduled transmission. In this example, the SCI indicates resource reservations for three transmissions.

In the third case (SCI Case 3), the SCI does not have an explicit field, but instead Reservation Field 0 with a certain value (e.g., a value of '0') indicates that the remaining resource reservation fields have different frequency resource allocations. As shown in Table 1, the first resource reservation is indicated by Reservation Field 1 having resource blocks RB_0, and the second resource reservation uses the bits of Reservation Fields 2 and 3 to indicate the different resource block allocation (RB_1). In this example, the SCI indicates resource reservations for only two transmissions.

In the fourth case (SCI Case 4), the SCI includes an explicit field with a value of '1', which, in this example, indicates the resource reservation fields have different frequency resource allocations. As shown in Table 1, the first resource reservation uses the bits of Reservation Field 0 to indicate the RB_0 frequency resource allocation, and the bits of Reservations Fields 1-3 may be divided among the second and third resource reservations to indicate the RB_1 frequency resource allocation. In this example, the SCI indicates resource reservations for three transmissions.

In the fifth case (SCI Case 5), the SCI does not have an explicit field, but instead Reservation Field 0 with a certain value (e.g., a value of '0') indicates that the remaining resource reservation fields have different frequency resource allocations. As shown in Table 1, the bits of Reservations Fields 1-3 are divided among the first and second resource reservations to indicate that the first resource reservation has a frequency allocation of RB_0 and the second resource reservation has a frequency allocation of RB_1. In this example, the SCI indicates resource reservations for only two transmissions.

TABLE 1

SCI Examples

| SCI Case | Explicit Flag | Reservation Field 0 | Reservation Field 1 | Reservation Field 2 | Reservation Field 3 |
|---|---|---|---|---|---|
| 1 | 0 | RB_0 | RB_0 | RB_0 | RB_0 |
| 2 | 1 | RB_0 | RB_1 | | RB_1 |
| 3 | N/A | 0 | RB_0 | RB_1 | |
| 4 | 1 | RB_0 | RB_1 | | RB_1 |
| 5 | N/A | 0 | RB_0 | | RB_1 |

According to certain aspects, as the first resource reservation in an SCI may schedule a transmission (e.g., PSSCH) in the same slot in which the control information is received, the first resource reservation may only indicate a frequency resource allocation. Expressed another way, as the time-domain resources may be implicitly indicated or preconfigured (e.g., as an offset of symbols from the PSCCH that carried the control information), the first resource reservation in an SCI may only indicate a frequency resource allocation, and the subsequent resource reservations in the SCI may indicate any changes in the frequency resource allocation. As an example, the indication of the first resource reservations and the second resource reservations in the control information of operations 500 may include an ordered set (e.g., a sequence) of resource reservations. The first resource reservation in the ordered set may only indicate a first frequency resource allocation, where the time-domain offset for the first resource reservation is already known by the UE (e.g., preconfigured or implicitly indicated). One or more resource reservations following the first resource reservation in the ordered set may indicate a second frequency resource allocation, if the one or more second resource reservations of operations 500 include the one or more resource reservations following the first resource reservation.

Figure 6:
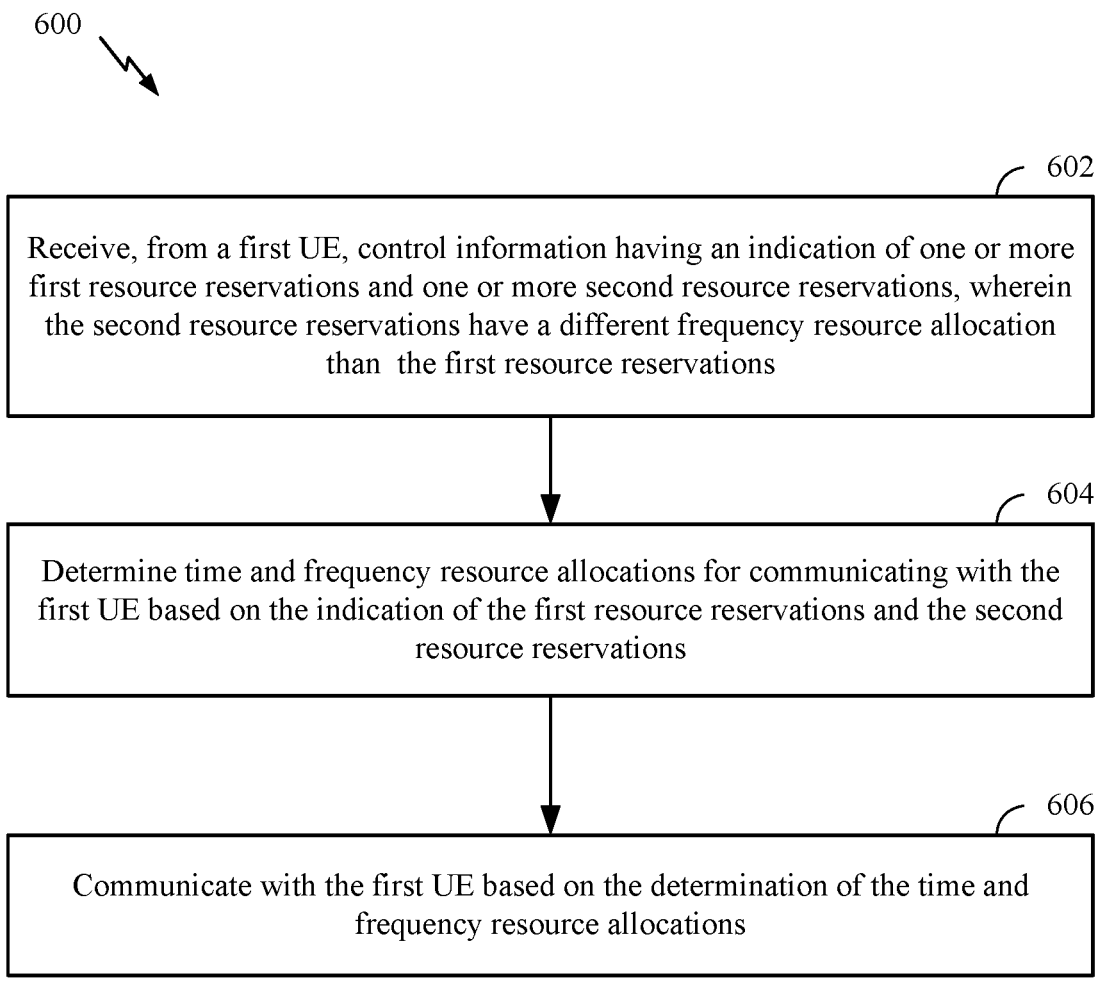
FIG. 6 is a flow diagram illustrating example operations for wireless communications by a second UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., the UE 120b in the wireless communication network 100). The operations 600 may be complimentary to the operations 500 performed by another UE. Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at 602, where a second UE (e.g., the UE 120b) may receive, from a first UE (e.g., the UE 120a), control information (e.g., SCI) having an indication of one or more first resource reservations and one or more second resource reservations, where the second resource reservations have a different frequency resource allocation than the first resource reservations. At 604, the second UE may determine time and frequency resource allocations (e.g., scheduled resources) for communicating with the first UE based on the indication of the first resource reservations and the second resource reservations. At 606, the second UE may communicate with the first UE based on the determination of the time and frequency resource allocations.

In certain aspects, at 606, the second UE may communicate with the first UE, for example, by transmitting data to the first UE in accordance with the resource reservations (e.g., at the scheduled time-domain resources and with the allocated frequency-domain resources). In other aspects, at 606, the second UE may communicate with the first UE by receiving data transmissions from the second UE in accordance with the resource reservations.

In aspects, the frequency resource allocation of the second resource reservations includes a different number of resource blocks than the first resource reservations. For example, the frequency resource allocation associated with each of the second resource reservations may have a greater number of resource blocks than the first resource reservation. In other examples, the frequency resource allocation associated with each of the second resource reservations may have a fewer number of resource blocks than the first resource reservation.

In certain aspects, the first and second UEs may be configured with various conditions or rules that trigger support of a single SCI with a flexible frequency resource allocation. For example, the second UE may obtain a configuration indicating whether the control information includes resource reservations with different frequency resource allocations. In aspects, the UEs may be configured by a base station via control signaling such as RRC signaling, MAC signaling (e.g., a MAC control element), or DCI. That is, the UEs may receive, from a base station, control signaling that indicates the configuration. In other aspects, the UEs may be preconfigured with the configuration indicating whether the control information includes resource reservations with different frequency resource allocations. That is, the configuration is preconfigured on the first UE and/or second UE.

In aspects, the configuration may indicate that a threshold number of resource reservations in the control information determines whether the control information includes resource reservations with different frequency resource allocations. For example, the configuration may indicate that a threshold number of resource reservations in the control information determines whether the control information includes the one or more second resource reservations with the different frequency resource allocation.

In certain cases, the configuration may indicate that if a number of resource reservations in the control information is less than (or equal to) the threshold number, the control information may include resource reservations with different frequency resource allocations (e.g., the one or more second resource reservations). If the number of the resource reservations in the control information is greater than (or equal to) the threshold number, the control information includes resource reservations with the same frequency resource allocation. As an example, if a maximum number of reservation per SCI is set to two, the configuration may allow for different frequency resource allocations in the SCI. Otherwise, the SCIs with a different number of reservations (e.g., 3 or 4) has the same frequency allocation.

In other cases, the configuration may indicate that if a number of resource reservations in the control information is greater than (or equal to) the threshold number, the control information may include resource reservations with different frequency resource allocations (e.g., the one or more second resource reservations). If the number of the resource reservations in the control information is less than (or equal to) the threshold number, the control information includes resource reservations with the same frequency resource allocation.

According to certain aspects, the configuration may indicate that resource reservations may be partitioned into subsets, where one of the subsets has a different frequency resource allocation than another subset in the control information. For example, the configuration indicates that one or more first subsets of resource reservations have a different frequency resource allocation than a second subset of the resource reservations in the control information.

In aspects, the subsets may be indicated by a number of resource reservations (e.g., 1, 2, or 3) associated with a segment of the resource reservations in the control information. For example, as the resource reservations may be ordered in a sequence in the control information, the subset that may have the different frequency resource allocation may be the first or last segment of resources reservations in the control information, and the number of resource reservations associated with the segment may provide the length of the segment of resource reservations in the control information. The location of the segment (e.g., first or last) in the control information may be preconfigured or configurable by control signaling. For example, the configuration may indicate that two resource reservations are in the segment, which may have the different frequency resource allocation. In certain cases, the segment may be associated with the first two resource reservations, which may have different frequency resource allocations than the last resource reservations. In other cases, the segment may be associated with the last two resource reservations, which may have different frequency resource allocations than the first resource reservations. As an example, the one or more second resource reservations of operations 600 may include the segment of the resource reservations indicated in the configuration.

In certain aspects, the configuration may indicate that each resource reservation in the control information has a flag that indicates whether the resource reservation has a different frequency resource allocation than a previous resource reservation. For example, the configuration may indicate that a flag associated with each of the first resource reservations and the second resource reservations of operations 600 indicates which one or more resource reservations are included in the one or more first sub sets.

According to certain aspects, the configuration may indicate that whether the control information includes resource reservations with different frequency resource allocations is based on whether resource reservations in the control information are associated with feedback based retransmissions or non-feedback based retransmission. For example, if one or more resource reservations in the control information are associated with feedback based retransmissions, the control information may include resource reservations with different frequency resource allocations. In other cases, if the resource reservations in the control information are associated with non-feedback based retransmissions, the control information may include resource reservations with the same frequency resource allocation.

In aspects, the configuration may indicate that whether the control information includes resource reservations with different frequency resource allocations is based on whether resource reservations in the control information are associated with the same TB or different TBs. For example, if the resource reservations in the control information are associated with the same TB, the control information may include resource reservations with the same frequency resource allocation. In other cases, if the resource reservations in the control information are associated with different TB s, the control information may include resource reservations with different frequency resource allocations.

In certain aspects, the size of the control information may be based on the configuration. For example, a flag associated with each resource reservation in the control information affects the size of the control information, and in some cases, may increase the size of the control information. As another example, the indication of the number of resource reservations in a segment may take an additional field, which affects the size of the control information. In other cases, if the flexible frequency resource allocation is based on feedback bases retransmissions, the control information size may not change.

In aspects, the frequency resources allocated to a UE may be dynamically indicated via SCI having resource reservations with different frequency resource allocations. In certain aspects, the control information may include an explicit field indicating which one or more resource reservations has a different frequency resource allocation. For example, the field may be a bitmap having a plurality of bits, and each of the bits corresponds to a different resource reservation in the control information. A certain value of each bit may indicate that the resource reservation associated with the bit has a different frequency resource allocation.

In certain cases, the field in the control information may indicate a number of resource reservations (e.g., 1, 2, or 3) associated with a segment of the resource reservations in the control information as described herein. For instance, as the resource reservations may be ordered in a sequence in the control information, the segment of resource reservations as indicated in the control information may be the first or last segment of resources reservations in the control information, and the number of resource reservations associated with the segment may provide the length of the segment of resource reservations in the control information. The location of the segment (e.g., first or last) in the control information may be preconfigured or configurable by control signaling. For example, the second UE may interpret the number of resource reservations associated with the segment as corresponding to the first or last resources reservations in the control information.

In aspects, the field in the control information may indicate whether the resource reservations are associated with feedback based retransmissions or non-feedback based retransmissions, which may implicitly indicate whether the resource reservations in the control information have different frequency resource allocations. In other words, the field may indicate which one or more resource reservations in the control information have the different frequency resource allocation based on the one or more resource reservations being associated with feedback based retransmissions or non-feedback based retransmissions. For example, if one or more resource reservations in the control information are associated with feedback based retransmissions, the control information may include resource reservations with different frequency resource allocations. In other cases, if the resource reservations in the control information are associated with non-feedback based retransmissions, the control information may include resource reservations with the same frequency resource allocation.

In aspects, the field in the control information may indicate whether the resource reservations are associated with the same TB or different TBs, which may implicitly indicate whether the resource reservations in the control information have different frequency resource allocations. Expressed another way, the field may indicate which one or more resource reservations in the control information has the different frequency resource allocation based on the one or more resource reservations being associated with the same TB or different TBs. For example, if the resource reservations in the control information are associated with the same TB, the control information may include resource reservations with the same frequency resource allocation. In other cases, if the resource reservations in the control information are associated with different TBs, the control information may include resource reservations with different frequency resource allocations.

According to certain aspects, rather than having a separate field, an existing field (e.g., a resource reservation filed) in the control information may have a special value that indicates whether the resource reservations have different frequency resource allocation. For instance, the control information may include a field having a plurality of values, where one of the values of the field indicates that the control information includes resource reservations (e.g., the one or more second resource reservations) with the different frequency resource allocation. As an example, the existing field may be a resource reservation field, and if the first resource reservation field is set to a certain value (e.g., all zeros), the remaining resource reservations may have different frequency resource allocations. In certain cases, the field is a resource reservation field of one of the first resource reservations and the second resource reservations of operations 600.

In aspects, the size of the SCI may remain the same size regardless of whether different frequency resource allocations for resource reservations are indicated in the SCI. In some aspects, the control information may have a fixed size. For example, as the size of the control information may be fixed, a total number of resource reservations indicated in the control information may be based on the number of resource reservations that have different frequency resource allocations as described herein with respect to operations 500 and Table 1.

According to certain aspects, as the first resource reservation in an SCI may schedule a transmission (e.g., PSSCH) in the same slot in which the control information is received, the first resource reservation may only indicate a frequency resource allocation. Expressed another way, as the time-domain resources may be implicitly indicated or preconfigured (e.g., as an offset of symbols from the PSCCH that carried the control information), the first resource reservation in an SCI may only indicate a frequency resource allocation, and the subsequent resource reservations in the SCI may indicate any changes in the frequency resource allocation. As an example, the indication of the first resource reservations and the second resource reservations in the control information of operations 600 may include an ordered set (e.g., a sequence) of resource reservations. The first resource reservation in the ordered set may only indicate a first frequency resource allocation, where the time-domain offset for the first resource reservation is already known by the UE (e.g., preconfigured or implicitly indicated). One or more resource reservations following the first resource reservation in the ordered set may indicate a second frequency resource allocation, if the one or more second resource reservations of operations 600 include the one or more resource reservations following the first resource reservation.

Figure 7:
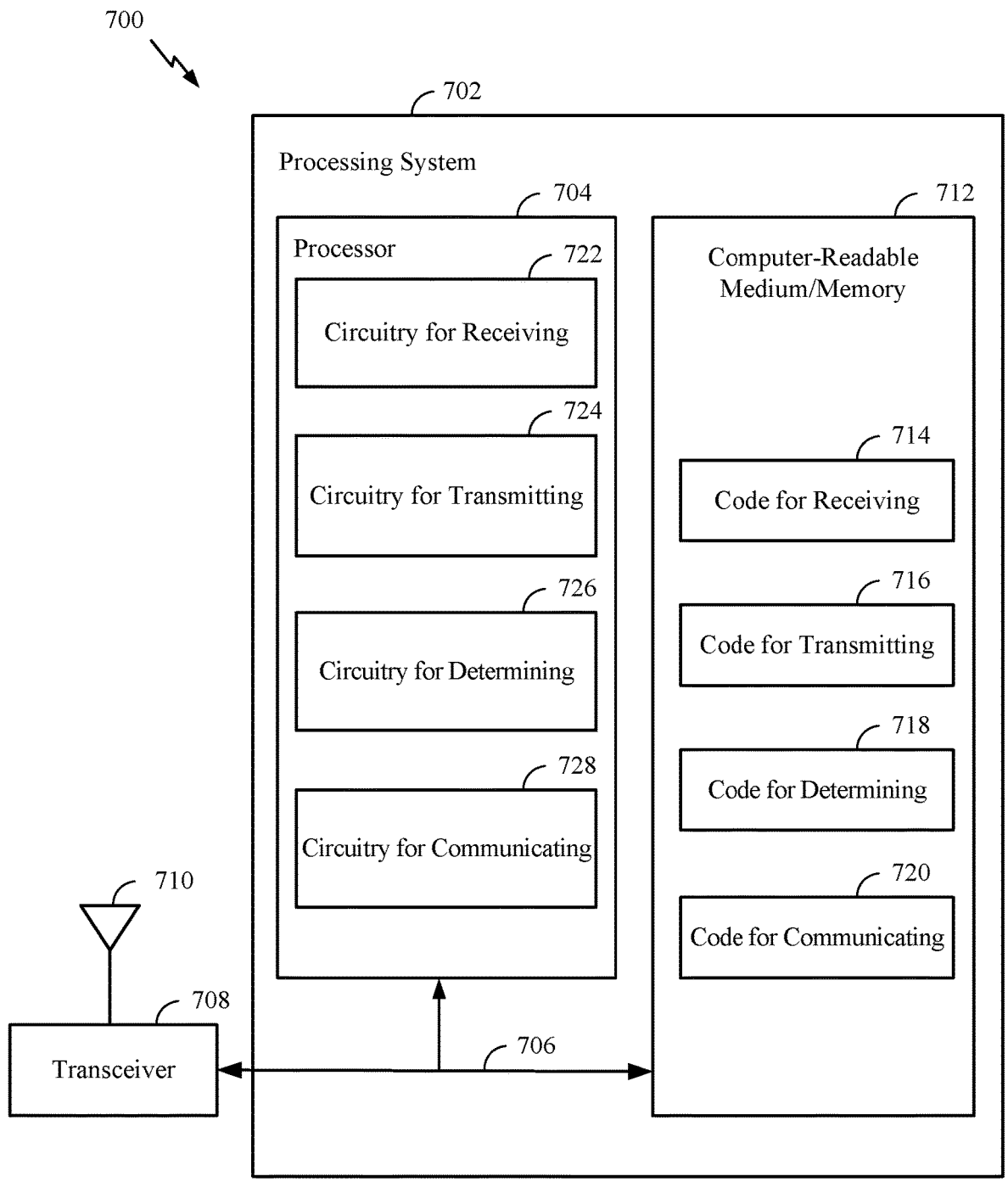
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIGS. 5 and 6. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIGS. 5 and 6, or other operations for performing the various techniques discussed herein for scheduling flexible resource reservations in sidelink communications. In certain aspects, computer-readable medium/memory 712 stores code for receiving (including code for obtaining) 714, code for transmitting 716, code for determining 718, and/or code for communicating 720. In certain aspects, the processor 704 has circuitry configured to implement the code stored in the computer-readable medium/memory 712. The processor 704 includes circuitry for receiving (including circuitry for obtaining) 722 (an example of means for receiving), circuitry for transmitting 724 (an example of means for transmitting), circuitry for determining 726 (an example of means for determining), and/or circuitry for communicating 728 (an example of means for communicating).

Means for receiving may include an antenna (e.g., the antennas 252a-252r), a transceiver (e.g., the transceivers 254a-254r), a processor (e.g., the controller/processor 280), and/or circuitry for receiving (e.g., the circuitry for receiving 722). Means for transmitting may include an antenna (e.g., the antennas 252a-252r), a transceiver (e.g., the transceivers 254a-254r), a processor (e.g., the controller/processor 280), and/or circuitry for transmitting (e.g., the circuitry for transmitting 724). Means for determining may include a processor (e.g., the controller/processor 280) and/or circuitry for determining (e.g., the circuitry for determining 726). Means for communicating may include a processor (e.g., the controller/processor 280) and/or circuitry for communicating (e.g., the circuitry for communicating 728). In certain aspects, various processors and/or various circuitry may include a circuit, a central processing unit (CPU), a graphics processing unit (GPU), a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein.

In addition to the examples described above, many examples of specific combinations are within the scope of the disclosure, some of which are detailed below:

Example 1: A method of wireless communication by a first user equipment (UE), comprising determining, for sidelink communications with a second UE, one or more first resource reservations and one or more second resource reservations, wherein the second resource reservations have a different frequency resource allocation than the first resource reservations; transmitting, to the second UE, control information having an indication of the first resource reservations and the second resource reservations; and communicating with the second UE based on the first resource reservations and the second resource reservations.

Example 2: The method of example 1, wherein the frequency resource allocation of the second resource reservations includes a different number of resource blocks than the first resource reservations.

Example 3: The method of examples 1 or 2, further comprising obtaining a configuration indicating whether the control information includes resource reservations with different frequency resource allocations, wherein a size of the control information is based on the configuration.

Example 4: The method of example 3, wherein obtaining the configuration includes receiving, from a base station, control signaling that indicates the configuration.

Example 5: The method of example 3, wherein the configuration is preconfigured on the first UE.

Example 6: The method of example 3, wherein the configuration indicates that a threshold number of resource reservations in the control information determines whether the control information includes the one or more second resource reservations with the different frequency resource allocation.

Example 7: The method of example 6, wherein the configuration indicates that if a number of resource reservations in the control information is equal to or less than the threshold number, the control information includes the one or more second resource reservations, and if the number of the resource reservations in the control information is greater than the threshold number, the control information includes resource reservations with a same frequency resource allocation.

Example 8: The method of example 3, wherein the configuration indicates that one or more first subsets of resource reservations have a different frequency resource allocation than a second subset of the resource reservations in the control information.

Example 9: The method of example 8, wherein the configuration indicates a number of resource reservations associated with a segment of the resource reservations in the control information; and the one or more second resource reservations include the segment of the resource reservations.

Example 10: The method of example 8, wherein the configuration indicates that a flag in the control information and associated with each of the first resource reservations and the second resource reservations indicates which one or more resource reservations are included in the one or more first subsets.

Example 11: The method of example 3, wherein the configuration indicates that whether the control information includes resource reservations with different frequency resource allocations is based on whether resource reservations in the control information are associated with feedback based retransmissions or non-feedback based retransmission.

Example 12: The method of example 11, wherein the configuration indicates that if one or more resource reservations in the control information are associated with feedback based retransmissions, the control information includes resource reservations with different frequency resource allocations, and if the resource reservations in the control information are associated with non-feedback based retransmissions, the control information includes resource reservations with a same frequency resource allocation.

Example 13: The method of examples 1-12, wherein the control information includes a field indicating which one or more resource reservations has the different frequency resource allocation, and wherein the field indicates at least one of a bitmap having a plurality of bits, and each of the bits corresponds to a different resource reservation in the control information; a number of resource reservations associated with a segment of the first resource reservations and the second resource reservations in the control information, and the one or more second resource reservations include the segment of the first resource reservations and the second resource reservations; which one or more resource reservations in the control information have the different frequency resource allocation based on the one or more resource reservations being associated with feedback based retransmissions or non-feedback based retransmissions; or which one or more resource reservations in the control information has the different frequency resource allocation based on the one or more resource reservations being associated with a same transport block or different transport blocks.

Example 14: A method of wireless communication by a second user equipment (UE), comprising receiving, from a first UE, control information having an indication of one or more first resource reservations and one or more second resource reservations, wherein the second resource reservations have a different frequency resource allocation than the first resource reservations; determining time and frequency resource allocations for communicating with the first UE based on the indication of the first resource reservations and the second resource reservations; and communicating with the first UE based on the determination of the time and frequency resource allocations.

Example 15: The method of example 14, wherein frequency resource allocation of the second resource reservations includes a different number of resource blocks than the first resource reservations.

Example 16: The method of examples 14 or 15, further comprising obtaining a configuration indicating whether the control information includes resource reservations with different frequency resource allocations, wherein a size of the control information is based on the configuration.

Example 17: The method of example 16, wherein obtaining the configuration includes receiving, from a base station, control signaling that indicates the configuration.

Example 18: The method of example 16, wherein the configuration is preconfigured on the second UE.

Example 19: The method of example 16, wherein the configuration indicates that a threshold number of resource reservations in the control information determines whether the control information includes the one or more second resource reservations with the different frequency resource allocation.

Example 20: The method of example 19, wherein the configuration indicates that if a number of resource reservations in the control information is equal to or less than the threshold number, the control information includes the one or more second resource reservations, and if the number of the resource reservations in the control information is greater than the threshold number, the control information includes resource reservations with a same frequency resource allocation.

Example 21: The method of example 16, wherein the configuration indicates that one or more first subsets of resource reservations have a different frequency resource allocation than a second subset of the resource reservations in the control information.

Example 22: The method of example 21, wherein the configuration indicates a number of resource reservations associated with a segment of the first resource reservations and the second resource reservations in the control information; and the one or more second resource reservations includes the segment of the first resource reservations and the second resource reservations.

Example 23: The method of example 21, wherein the configuration indicates that a flag in the control information and associated with each of the first resource reservations and the second resource reservations indicates which one or more resource reservations are included in the one or more first subsets.

Example 24: The method of example 16, wherein the configuration indicates that whether the control information includes resource reservations with different frequency resource allocations is based on whether resource reservations in the control information are associated with feedback based retransmissions or non-feedback based retransmission.

Example 25: The method of example 24, wherein the configuration indicates that if one or more of resource reservations in the control information are associated with feedback based retransmissions, the control information includes resource reservations with different frequency resource allocations, and if resource reservations in the control information are associated with non-feedback based retransmissions, the control information includes resource reservations with a same frequency resource allocation.

Example 26: The method of examples 14-25, wherein the control information includes a field indicating which one or more resource reservations has the different frequency resource allocation, and wherein the field indicates at least one of a bitmap having a plurality of bits, and each of the bits corresponds to a different resource reservation in the control information; a number of resource reservations associated with a segment of the first resource reservations and the second resource reservations in the control information, and the one or more second resource reservations include the segment of the first resource reservations and the second resource reservations; which one or more resource reservations in the control information have the different frequency resource allocation based on the one or more resource reservations being associated with feedback based retransmissions or non-feedback based retransmissions; or which one or more resource reservations in the control information has the different frequency resource allocation based on the one or more resource reservations being associated with a same transport block or different transport blocks.

Example 27: An apparatus for wireless communication, comprising a processing system configured to determine, for sidelink communications with a user equipment (UE), one or more first resource reservations and one or more second resource reservations, wherein the second resource reservations have a different frequency resource allocation than the first resource reservations; and a transceiver configured to transmit, to the UE, control information having an indication of the first resource reservations and the second resource reservations; and communicate with the UE based on the first resource reservations and the second resource reservations.

Example 28: The apparatus of example 27, wherein the control information includes a field having a plurality of values, one of which indicates that the control information includes the one or more second resource reservations with the different frequency resource allocation, the field is a resource reservation field of one of the first resource reservations and the second resource reservations, a total number of resource reservations indicated in the control information is based on a number of resource reservations that have different frequency resource allocation, and the control information has a fixed size.

Example 29: An apparatus for wireless communication, comprising a transceiver configured to receive, from a user equipment (UE), control information having an indication of one or more first resource reservations and one or more second resource reservations, wherein the second resource reservations have a different frequency resource allocation than the first resource reservations; a processing system configured to determine time and frequency resource allocations for communicating with the UE based on the indication of the first resource reservations and the second resource reservations; and wherein the transceiver is further configured to communicate with the UE based on the determination of the time and frequency resource allocations.

Example 30: The apparatus of example 29, wherein the indication of the first resource reservations and the second resource reservations includes an ordered set of resource reservations; a first resource reservation in the ordered set indicates a first frequency resource allocation; and one or more resource reservations following the first resource reservation in the ordered set indicates a second frequency resource allocation if the one or more second resource reservations include the one or more reservations following the first reservation.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a first user equipment (UE), comprising:
 determining, for sidelink communications with a second UE, one or more first resource reservations and one or more second resource reservations, wherein the one or more second resource reservations have a different frequency resource allocation than the one or more first resource reservations;
 obtaining a configuration indicating whether control information includes resource reservations with different frequency resource allocations, wherein a size of the control information is based on the configuration, wherein the configuration further indicates that a threshold number of resource reservations in the control information determines whether the control information includes the one or more second resource reservations with the different frequency resource allocation;
 transmitting, to the second UE, a single control information transmission indicating the control information, wherein the control information includes an indication of the one or more first resource reservations and the one or more second resource reservations; and
 communicating with the second UE based on the one or more first resource reservations and the one or more second resource reservations.

2. The method of claim 1, wherein the frequency resource allocation of the one or more second resource reservations includes a different number of resource blocks than the one or more first resource reservations.

3. The method of claim 1, wherein obtaining the configuration includes receiving, from a base station, control signaling that indicates the configuration.

4. The method of claim 1, wherein the configuration is preconfigured on the first UE.

5. The method of claim 1, wherein the configuration indicates that:
 if a number of resource reservations in the control information is equal to or less than the threshold number, the control information includes the one or more second resource reservations, and
 if the number of the resource reservations in the control information is greater than the threshold number, the control information includes resource reservations with a same frequency resource allocation.

6. The method of claim 1, wherein the configuration indicates that one or more first subsets of resource reservations have a different frequency resource allocation than a second subset of the resource reservations in the control information.

7. The method of claim 6, wherein:
 the configuration indicates a number of resource reservations associated with a segment of the resource reservations in the control information; and
 the one or more second resource reservations include the segment of the resource reservations.

8. The method of claim 6, wherein the configuration indicates that a flag in the control information and associated with each of the one or more first resource reservations and the one or more second resource reservations indicates which one or more resource reservations are included in the one or more first subsets.

9. The method of claim 1, wherein the configuration indicates that whether the control information includes resource reservations with different frequency resource allocations is based on whether resource reservations in the control information are associated with feedback based retransmissions or non-feedback based retransmission.

10. The method of claim 9, wherein the configuration indicates that
 if one or more resource reservations in the control information are associated with feedback based retransmissions, the control information includes resource reservations with different frequency resource allocations, and
 if the resource reservations in the control information are associated with non-feedback based retransmissions, the control information includes resource reservations with a same frequency resource allocation.

11. The method of claim 1, wherein the control information includes a field indicating which one or more resource reservations has the different frequency resource allocation, and wherein the field indicates at least one of:
 a bitmap having a plurality of bits, and each of the bits corresponds to a different resource reservation in the control information;
 a number of resource reservations associated with a segment of the one or more first resource reservations and the one or more second resource reservations in the control information, and the one or more second resource reservations include the segment of the one or more first resource reservations and the one or more second resource reservations;
 which one or more resource reservations in the control information have the different frequency resource allocation based on the one or more resource reservations being associated with feedback based retransmissions or non-feedback based retransmissions; or
 which one or more resource reservations in the control information has the different frequency resource allocation based on the one or more resource reservations being associated with a same transport block or different transport blocks.

12. A method of wireless communication by a second user equipment (UE), comprising:
 receiving, from a first UE, a single control information transmission indicating control information, wherein the control information includes an indication of one or more first resource reservations and one or more second resource reservations, wherein the one or more second resource reservations have a different frequency resource allocation than the one or more first resource reservations, and wherein a size of the control information is based on a configuration indicating whether the control information includes resource reservations with different frequency resource allocations, wherein the configuration further indicates that a threshold number of resource reservations in the control information determines whether the control information includes the one or more second resource reservations with the different frequency resource allocation;
 determining time and frequency resource allocations for communicating with the first UE based on the indication of the one or more first resource reservations and the one or more second resource reservations; and communicating with the first UE based on the determination of the time and frequency resource allocations.

13. The method of claim 12, wherein the frequency resource allocation of the one or more second resource reservations includes a different number of resource blocks than the one or more first resource reservations.

14. The method of claim 12, wherein the configuration is obtained by receiving, from a base station, control signaling that indicates the configuration.

15. The method of claim 12, wherein the configuration is preconfigured on the second UE.

16. The method of claim 12, wherein the configuration indicates that:
if a number of resource reservations in the control information is equal to or less than the threshold number, the control information includes the one or more second resource reservations, and
if the number of the resource reservations in the control information is greater than the threshold number, the control information includes resource reservations with a same frequency resource allocation.

17. The method of claim 12, wherein the configuration indicates that one or more first subsets of resource reservations have a different frequency resource allocation than a second subset of the resource reservations in the control information.

18. The method of claim 17, wherein:
the configuration indicates a number of resource reservations associated with a segment of the one or more first resource reservations and the one or more second resource reservations in the control information; and
the one or more second resource reservations includes the segment of the one or more first resource reservations and the one or more second resource reservations.

19. The method of claim 17, wherein the configuration indicates that a flag in the control information and associated with each of the one or more first resource reservations and the one or more second resource reservations indicates which one or more resource reservations are included in the one or more first subsets.

20. The method of claim 12, wherein the configuration indicates that whether the control information includes resource reservations with different frequency resource allocations is based on whether resource reservations in the control information are associated with feedback based retransmissions or non-feedback based retransmission.

21. The method of claim 20, wherein the configuration indicates that:
if one or more of resource reservations in the control information are associated with feedback based retransmissions, the control information includes resource reservations with different frequency resource allocations, and
if resource reservations in the control information are associated with non-feedback based retransmissions, the control information includes resource reservations with a same frequency resource allocation.

22. The method of claim 12, wherein the control information includes a field indicating which one or more resource reservations has the different frequency resource allocation, and wherein the field indicates at least one of:
a bitmap having a plurality of bits, and each of the bits corresponds to a different resource reservation in the control information;
a number of resource reservations associated with a segment of the one or more first resource reservations and the one or more second resource reservations in the control information, and the one or more second resource reservations include the segment of the one or more first resource reservations and the one or more second resource reservations;
which one or more resource reservations in the control information have the different frequency resource allocation based on the one or more resource reservations being associated with feedback based retransmissions or non-feedback based retransmissions; or
which one or more resource reservations in the control information has the different frequency resource allocation based on the one or more resource reservations being associated with a same transport block or different transport blocks.

23. An apparatus for wireless communication, comprising:
a memory;
a processor coupled to the memory, the processor and the memory being configured to:
determine, for sidelink communications with a user equipment (UE), one or more first resource reservations and one or more second resource reservations, wherein the one or more second resource reservations have a different frequency resource allocation than the one or more first resource reservations; and
obtain a configuration indicating whether control information includes resource reservations with different frequency resource allocations, wherein a size of the control information is based on the configuration, wherein the configuration indicates that a threshold number of resource reservations in the control information determines whether the control information includes the one or more second resource reservations with the different frequency resource allocation; and
a transceiver configured to:
transmit, to the UE, a single control information transmission indicating the control information, wherein the control information includes an indication of the one or more first resource reservations and the one or more second resource reservations; and
communicate with the UE based on the one or more first resource reservations and the one or more second resource reservations.

24. The apparatus of claim 23, wherein:
the control information includes a field having a plurality of values, one of which indicates that the control information includes the one or more second resource reservations with the different frequency resource allocation,
the field is a resource reservation field of one of the one or more first resource reservations and the one or more second resource reservations,
a total number of resource reservations indicated in the control information is based on a number of resource reservations that have different frequency resource allocation, and
the control information has a fixed size.

25. An apparatus for wireless communication, comprising:
a transceiver configured to receive, from a user equipment (UE), a single control information transmission indicating control information, wherein the control information includes an indication of one or more first resource reservations and one or more second resource reservations, wherein the one or more second resource reservations have a different frequency resource allocation than the one or more first resource reservations, and wherein a size of the control information is based on a configuration indicating whether the control information includes resource reservations with different frequency resource allocations, wherein the configuration indicates that a threshold number of resource reservations in the control information determines whether the control information includes the one or more second resource reservations with the different frequency resource allocation;

a memory; and a processor coupled to the memory, the processor and the memory being configured to determine time and frequency resource allocations for communicating with the UE based on the indication of the one or more first resource reservations and the one or more second resource reservations;

wherein the transceiver is further configured to communicate with the UE based on the determination of the time and frequency resource allocations.

26. The apparatus of claim 25, wherein:

the indication of the one or more first resource reservations and the one or more second resource reservations includes an ordered set of resource reservations;

a first resource reservation in the ordered set indicates a first frequency resource allocation; and one or more resource reservations following the first resource reservation in the ordered set indicates a second frequency resource allocation if the one or more second resource reservations include the one or more reservations following the first reservation.

* * * * *